US010953325B2

(12) United States Patent
Leung et al.

(10) Patent No.: US 10,953,325 B2
(45) Date of Patent: Mar. 23, 2021

(54) RESOURCE SELECTION FOR HOSTED GAME SESSIONS

(71) Applicant: Amazon Technologies, Inc., Reno, NV (US)

(72) Inventors: Hok Peng Leung, Redmond, WA (US); Geoffrey Scott Pare, Seattle, WA (US); Christopher Paul Dury, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/659,325

(22) Filed: Oct. 21, 2019

(65) Prior Publication Data

US 2020/0047067 A1 Feb. 13, 2020

Related U.S. Application Data

(63) Continuation of application No. 15/816,152, filed on Nov. 17, 2017, now Pat. No. 10,456,673.

(51) Int. Cl.
*A63F 13/00* (2014.01)
*A63F 13/358* (2014.01)

(52) U.S. Cl.
CPC .................. *A63F 13/358* (2014.09)

(58) Field of Classification Search
None
See application file for complete search history.

(56) References Cited

U.S. PATENT DOCUMENTS

| 9,805,067 | B1* | 10/2017 | Cottrell | A63F 13/30 |
| 10,461,991 | B1* | 10/2019 | Morley | H04L 41/0681 |
| 2003/0063072 | A1* | 4/2003 | Brandenberg | H04M 1/0233 345/173 |
| 2004/0002383 | A1* | 1/2004 | Lundy | G07F 17/323 463/42 |
| 2006/0107062 | A1* | 5/2006 | Fauthoux | H04L 9/0891 713/182 |

(Continued)

OTHER PUBLICATIONS

Non-Final Office Action issued in related U.S. Appl. No. 15/816,152 dated Mar. 7, 2019.

(Continued)

*Primary Examiner* — Paul A D'Agostino
(74) *Attorney, Agent, or Firm* — Hogan Lovells US LLP

(57) ABSTRACT

Resources for hosting game sessions can be dynamically selected based upon factors in addition to availability and capacity. A requested session may have various criteria enabling it to be hosted on different types of resources, such as different types of resource instances operating on physical servers. While a fixed amount of capacity can be purchased over an extended period of time, options can also exist that enable purchasing resource capacity for a limited period of time, or purchasing excess capacity without a fixed time limit but that is subject to potential interruption. Benefits relating to cost and performance may offset these potential limitations, and the selection of a type of resource to host a game can be based upon an analysis of these factors. If a game session is to be interrupted or will time out, advance notice can be provided such that the game can take a corresponding action.

20 Claims, 9 Drawing Sheets

(56) References Cited

U.S. PATENT DOCUMENTS

| | | | |
|---|---|---|---|
| 2006/0160615 A1* | 7/2006 | Boyd | G07F 17/3239 463/30 |
| 2008/0212537 A1* | 9/2008 | Bukai | H04W 36/30 370/332 |
| 2011/0028203 A1* | 2/2011 | Agarwal | G07F 17/3211 463/20 |
| 2011/0069720 A1* | 3/2011 | Jacobs | H04H 20/61 370/466 |
| 2011/0302617 A1* | 12/2011 | Greenfield | H04N 21/4781 725/96 |
| 2012/0131466 A1* | 5/2012 | Bugenhagen | H04L 45/74 715/733 |
| 2012/0311107 A1* | 12/2012 | Van der Merwe | H04L 12/4641 709/220 |
| 2013/0268652 A1* | 10/2013 | Hugard, IV | H04W 4/80 709/224 |
| 2014/0108333 A1* | 4/2014 | Jain | H04L 67/22 707/609 |
| 2014/0172706 A1* | 6/2014 | Condry | G06Q 30/00 705/44 |
| 2014/0173738 A1* | 6/2014 | Condry | G06F 21/568 726/25 |
| 2015/0375113 A1* | 12/2015 | Justice | A63F 13/355 463/42 |
| 2016/0005260 A1* | 1/2016 | Miyagawa | G07F 17/3267 463/31 |
| 2016/0021132 A1* | 1/2016 | Sheppard | H04L 67/34 726/23 |
| 2016/0027246 A1* | 1/2016 | Newton | G07F 17/3237 463/16 |
| 2016/0065655 A1* | 3/2016 | Bentley | A61B 5/681 709/201 |
| 2016/0085654 A1* | 3/2016 | Khoury | G06F 11/3051 710/17 |
| 2016/0184712 A1* | 6/2016 | Colenbrander | A63F 13/493 463/29 |
| 2016/0197844 A1* | 7/2016 | Smith | G06F 9/5061 709/226 |
| 2017/0278289 A1* | 9/2017 | Marino | G06Q 30/0276 |
| 2018/0060395 A1* | 3/2018 | Pathak | G06F 9/505 |
| 2018/0167402 A1* | 6/2018 | Scheidler | H04L 63/1416 |
| 2019/0306752 A1* | 10/2019 | Lai | H04L 45/38 |

OTHER PUBLICATIONS

Notice of Allowance issued in related U.S. Appl. No. 15/816,152 dated Jun. 26, 2019.

* cited by examiner

RESOURCE SELECTION FOR HOSTED GAME SESSIONS

CROSS-REFERENCE TO RELATED APPLICATIONS

This application is a continuation of allowed U.S. application Ser. No. 15/816,152, entitled "RESOURCE SELECTION FOR HOSTED GAME SESSIONS", filed Nov. 17, 2017; of which the full disclosure of this application is incorporated herein by reference for all purposes.

BACKGROUND

The widespread adoption of a variety of computing devices has resulted in a corresponding increase in the variety of gaming options available to players. Many of these games enable users to engage in online multiplayer games, which may be hosted by a central gaming server. The amount of resource capacity needed to host the variety of games has become significant, such that many providers use third party resource providers to host the games. While such an approach prevents the game developers from having to purchase and manage a large fleet of resources, the need to purchase capacity from these providers can still be significant. For large games that require significant capacity, this can still be too expensive for the developers to utilize for an extended period of time, or without charging excess fees to the players of those games.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for execution and management of electronic gaming applications. In particular, various approaches provide for the dynamic selection of types of resource capacity to be used to host specific game sessions. When requesting a game session to be hosted in a shared resource environment, for example, the session may have various criteria that enable it to be hosted on different types of resources, such as different types of resource instances (i.e., virtual machines) operating on physical servers. While a customer having the game hosted can purchase a fixed amount of capacity over a long period of time, the customer can also have the option of purchasing resource capacity for a limited period of time, or purchasing excess capacity without a fixed time limit, but that might be subject to interruption. The limited time and excess capacity instances can come at a significantly lower cost, but with these and potentially other tradeoffs. Factors such as the risk of interruption and amount of acceptable latency can be used, along with timing, cost, and other criteria, so select from the available capacity for hosting a game session, or other application or task, on behalf of a customer. If a game session is to be interrupted or will time out from the limited time, advance notice can be provided such that the game can take a corresponding action. Concurrent sessions for a game can be hosted on different types of resources in different locations as long as the resources satisfy (or are otherwise closest to satisfying) the requirements for the game.

Various other functions can be implemented within the various embodiments as well as discussed and suggested elsewhere herein.

Figure 1:
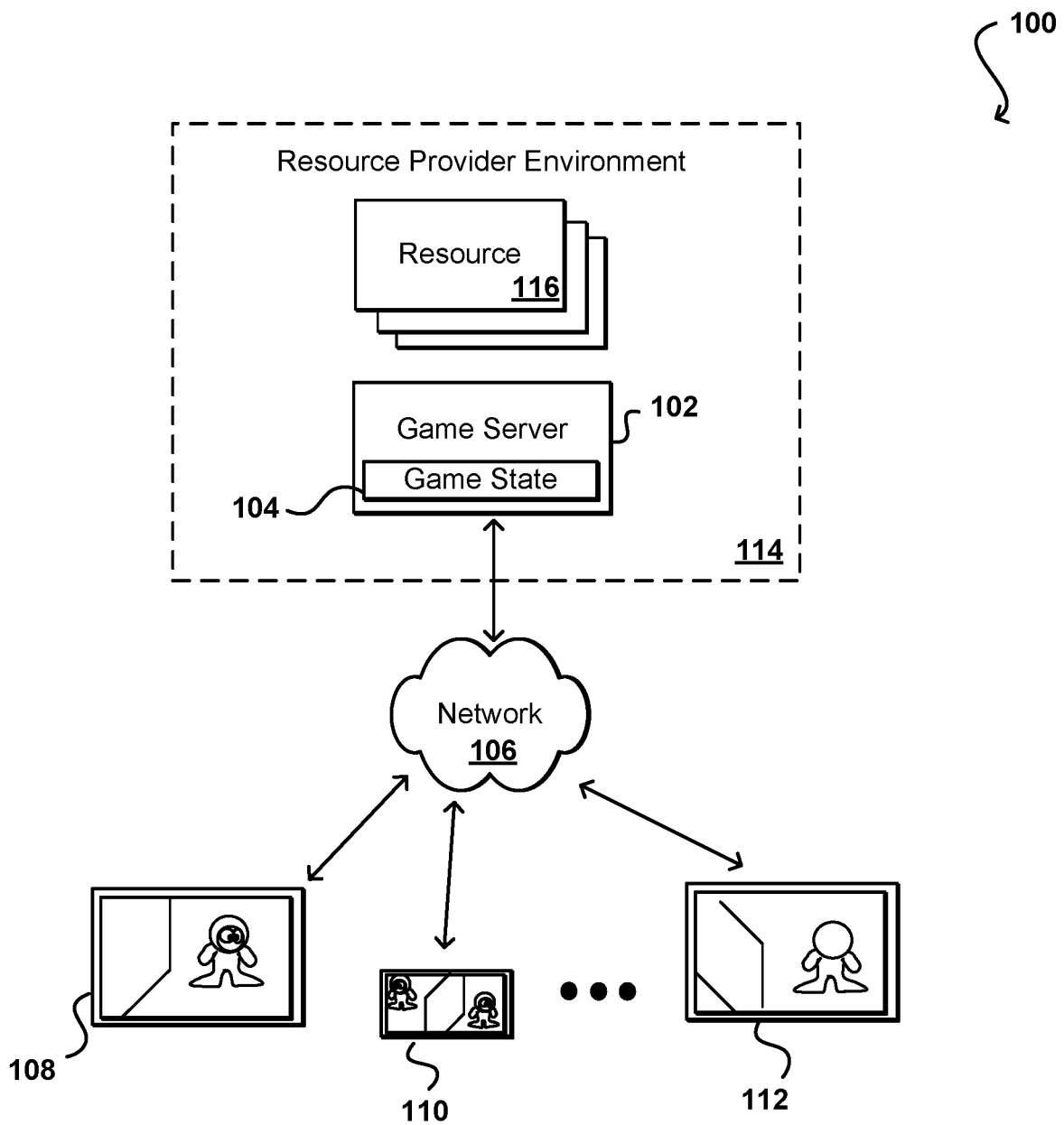
FIG. 1 illustrates devices joined in an example gameplay session for a multiplayer game that can be utilized in accordance with various embodiments.

FIG. 1A illustrates an example gaming configuration 100 that can be managed in accordance with various embodiments. In this example, a gaming session is hosted on at least one game server 102. The game server 102 can be a local gaming machine or a remote server operated by a game provider, among other such options. In this example, the game server can be a dedicated server or a server instance, such as a virtual machine or machine instance, running on one or more resources 116 provided through a resource provider environment 114. As discussed elsewhere herein, a game developer might purchase an amount of resource capacity from the resource provider that can be provided using the resources 116, where each resource may be able to host multiple game sessions. Approaches for obtaining and managing resources for gaming sessions are discussed in more detail elsewhere herein.

In this example the game offers multiplayer capability, whereby multiple players can utilize respective devices 108, 110, 112 to connect to the game server 102 over at least one network 106, such as the Internet, a local area network, a dedicated gaming network, a peer-to-peer network, or a cellular network, among other such options and combinations thereof. The players can join in a session of the game with state data that is managed by a game state component 104 of the game server. In some embodiments one or more game servers 102 can execute the game, while in others the servers can manage game state for instances of the game executing on the various player devices 108, 110, 112, among other such options. These devices can include specific gaming devices, such as gaming consoles or handheld consoles, or other computing devices such as smart phones, tablet computers, wearable computers (e.g., smart glasses or watches), desktop or notebook computers, and the like. State information can be transmitted to the gaming server 102 at appropriate times, such as periodically, in response to certain actions or occurrences in the game, in response to requests from the server, or at other appropriate times. The game server can maintain the state information such that the game state is consistent across the various devices, as well as to enable a saving or restoring of the game for any or all of the devices.

In many instances, a first player will submit a request to join a session of a specified gaming application supported by the game server 102. If there is an existing game session for which the player qualifies, such as by having an appropriate skill level or qualification, then the player can be added to the existing game session. If there is no existing game session for which the player qualifies, or if games can only be joined before the session starts, then the request can trigger the initiation of a new session for the game. If a resource is not already allocated for this session, then a new resource or resource instance can be selected to host the gaming session. In some embodiments the new session can begin immediately, while in other embodiments or for specific games there might need to be a specified number, minimum number, or quorum of players for a session before the session can begin. For example, if a game requires ten players then a session might not start before ten players have joined, with the first nine players having to wait at least until a tenth player joins. In some cases additional players can join during a session, such as up to a maximum number of players in some embodiments, while in others players may not be able to join, or may only be able to join if a current player leaves the session, etc.

In many situations, the player devices will be at different geographical locations. In order to ensure that all the game state information utilized by the player devices is accurate, player input in many cases will be transmitted from the individual player devices to the relevant game server 102, such that the game state can be updated by the game state manager 104, and the updated game state information can be propagated to the various player devices such that the devices are all utilizing consistent game state information. The game state information can include, for example, position and orientation information for the players and objects in the game, as well as gameplay data for actions being performed in the game environment by any of the players or other gameplay elements. Such an approach can result in difficulty managing state for the game, however, as any instance of player data must be transmitted from the respective player device to the server, and sent back to the relevant gaming devices. Since players can have various types of network connections with differing speeds, including cellular and landline-based connections, there can be significant latency involved in getting gameplay data from one player device to another. For games such as real time, multiplayer online video games, this latency can have a meaningful, negative impact on gameplay. For example, if the game involves throwing a ball or shooting a paint gun, a first player might direct the action towards a last known location received for a target player. The action will be likely to miss, as the other player may have moved since the last received location such that the first player may see the action take place but the action will actually fail because when the game state data is synchronized the target player will actually not have been in that location. The game server then might have to retract the apparently completed action, or wait to determine whether the action is successful, either of which can significantly degrade the gaming experience.

It might be the case that the available resource capacity is located in different geographical or physical locations. The distance between the resource and the gaming devices can further impact the latency for the game session, which can have negative implications as discussed. Thus, it can be desirable in at least some situations to attempt to provide the capacity using resources that are relatively close to the players to the game, in order to minimize latency due to physical distance. It may not always be practical, however, to select the closest available resource capacity, however, as there may be other considerations relating to the selected resource. For example, different types of resource capacity can have different costs, and it may be cheaper for a developer to buy a fixed amount of capacity even though that capacity might not always be the closest to the potential players.

In order to help alleviate this problem, some resource providers enable customers, such as game developers, to purchase resource capacity, such as specific compute instance, on an as-needed basis, or on-demand. The ability to purchase capacity with this amount of flexibility comes with a certain price, however, as the resource provider has to maintain sufficient available capacity to support this offering. Accordingly, approaches in accordance with various embodiments attempt to provide different capacity offerings that are able to support the performance of various tasks, such as hosting game sessions, at a lower price and/or with greater flexibility.

A particular aspect to certain types of games, versus other electronic applications, is that many types of games have fixed or maximum durations or times of execution. For example, a sporting game might have a fixed time limit, and other games might have a maximum amount of time allocated to complete a task, such as a time limit for completing a race. Given some amount of time for startup and completion, for many types of games a determination can be made as to the maximum length of time for which a resource will be needed. For such an approach, a customer might be able to purchase a limited-time resource, such as a compute instance that will be exclusively allocated to that customer for up to the maximum amount of time. In some embodiments the customer may only be charged for the amount of time actually used, but will have that resource reserved for up to the allocated amount of time.

For other games, the length of time may not be reasonably certain or determinable. For these types of games, a limited time resource may not be appropriate. It might be the case, however, that due to the nature of the game or the revenue model for the game that the developer may want to use lower cost resources where available. For some of these developers it may make sense to purchase excess resource capacity where available. Such an approach is sometimes referred to as a "spot" market, whereby customer can bid for capacity that is reserved for other customers but not currently being used. Since this capacity is already paid for by another customer or entity, the excess capacity can come at a significantly lower price than if reserving that amount of capacity. The customer having reserved the capacity may also get some discount or price break for allowing the excess capacity to be made available on the spot market. A customer can attempt to obtain the lower cost capacity, and use it as long as it is available and the gaming session is active. It is always possible, however, that the reserved customer can reclaim that capacity for use. The reclaiming of that capacity can cause the gaming session hosted on that capacity to end, although in other embodiments the session may be able to be moved to other, potentially higher cost resources. In many embodiments a notice will be provided at a point in time before the termination of the resource allocation, such as two minutes before the capacity will be reclaimed for use by the reserved customer. The game developer can then take various actions to account for the early termination, such as to notify the players and potentially modify one or more aspects of the game, as discussed in detail elsewhere herein. The spot instances may be the least expensive option, but are not guaranteed for any length of time other than the notice period in some embodiments. In at least some embodiments, however, there may be at least a minimum amount of time for a spot instance, such as at least five minutes in some embodiments.

When attempting to obtain capacity to host a game session, a customer of a resource provider in at least some embodiments can provide an actual, maximum, or anticipated length of time, or can identify a type of game for which such a period can be determined, such as may be based on historical data. The customer may also provide information such as whether the customer is willing for the session to be interrupted, and in some cases a maximum likelihood of interruption. For example, a customer might be willing to risk a 1%-3% chance of interruption for a 45% cost savings, but may not be willing to risk more than that for at least some game sessions. The customer may specify a blanket risk, or can specify for individual sessions, as may be based upon factors such as the type or level of players, type of game, predicted game length or outcome, and the like. The selection of available resource capacity can then consider these factors when selecting one or more resources to host the session. A customer may also be able to specify whether to favor cost savings or game performance, among other such options. If excess capacity can be identified that meets the criteria for the session, then the excess capacity can be selected to maximize cost savings. If, however, the risk of interruption is too great but the game is of a determinable maximum length, then a time-limited resource may be selected. If the risk of the excess capacity is too great and the game is of indeterminable length, then a conventional resource selection process can be used, such as may utilize reserved capacity for that customer. Various other resource allocation processes can be used as well as discussed and suggested herein.

Further, there may be additional considerations for resource selection as mentioned herein. For example, the customer might provide a maximum acceptable latency threshold that must be satisfied. It might be the case, then, that available excess capacity could be used to host the game session, but that the latency cannot be guaranteed to be within the allowable limit based upon factors such as physical distance between the capacity and the players. Thus, different but more expensive capacity may need to be selected. In some embodiments there may be excess capacity available that is cheaper but comes with greater latency. There may also be limited-time capacity that is slightly more expensive, but offers better latency performance. A selection algorithm or weighted combination of factors can then be used in some embodiments to select the appropriate capacity for hosting a session. As mentioned, a customer might select to optimize for performance or cost, which can impact the selection process. The customer might also provide some criteria, such as a function that indicates the acceptable tradeoff between cost and latency. Such a function may also take into account the risk of interruption. A resource allocation manager or other such component may then generate a score for each resource option, which can then provide a ranking or other indication for the various options. In such an embodiment, the highest ranking option may be selected, where the score is based on a combination of factors that may include projected or historical latency, projected risk of interruption, and cost, for resource capacity that is able to be provided of the type and for the length of time requested. In some embodiments the cost savings might not be in a per-minute savings but in a per session savings. For example, if a prior approach sold capacity by the hour then an approach that enables a customer to buy capacity by the minute might charge more per minute, but a three minute allocation may cost significantly less than a one hour allocation. On the other hand, capacity that is not guaranteed and can be interrupted may be significantly less on a per-minute (or other measure) basis. And in some embodiments the session requests can include bid prices for each type of capacity, where the request specifies a ranking and price for each available capacity option and then the highest ranked option where the bid is a winning bid is selected for that customer session. Approaches to bidding for resource capacity are known in the art and, as such, will not be discussed herein in detail. Such an approach would expand upon the options available for bidding through such a system.

In some embodiments a customer may also be able to specify a set of instance types that can be used to support a specific type of game session. The customer can provide the relevant configuration for each, as well as the maximum latency or interruption risk values, etc. This information can be used to determine the available capacity for a session, and the individual characteristics and criteria can then be used to rank the options within that available capacity. As mentioned, the customer can also provide information as to whether to optimize for performance or cost as discussed herein. This information can be analyzed for each received request, such as for each gaming session to be hosted in a resource provider or "cloud" environment.

Figure 2:
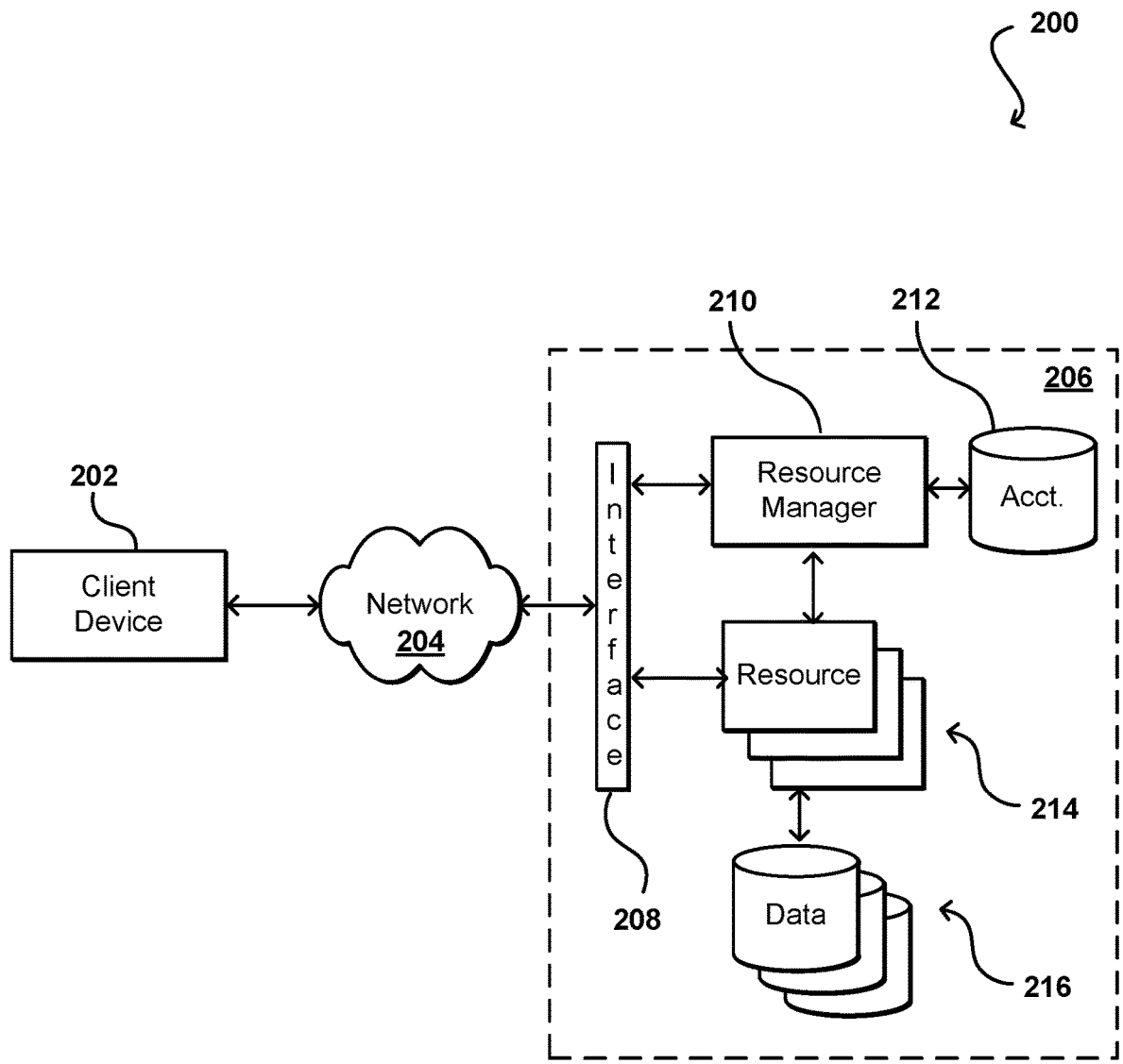
FIG. 2 illustrates an example resource environment in which various embodiments can be implemented.

FIG. 2 illustrates an example environment 200 in which aspects of the various embodiments can be implemented. In this example a user is able to utilize a client device 202 to submit requests across at least one network 204 to a multi-tenant resource provider environment 206. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 204 can include any appropriate network, including an intranet, the Internet, a cellular network, a local area network (LAN), or any other such network or combination, and communication over the network can be enabled via wired and/or wireless connections. The resource provider environment 206 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 214 of one or more types. These types can include, for example, application servers operable to process instructions provided by a user or database servers operable to process data stored in one or more data stores 216 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 214 can submit a request that is received to an interface layer 208 of the provider environment 206. The interface layer can include application programming interfaces (APIs) or other exposed interfaces enabling a user to submit requests to the provider environment. The interface layer 208 in this example can also include other components as well, such as at least one Web server, routing components, load balancers, and the like. When a request to provision a resource is received to the interface layer 208, information for the request can be directed to a resource manager 210 or other such system, service, or component configured to manage user accounts and information, resource provisioning and usage, and other such aspects. A resource manager 210 receiving the request can perform tasks such as to authenticate an identity of the user submitting the request, as well as to determine whether that user has an existing account with the resource provider, where the account data may be stored in at least one data store 212 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 202 to communicate with an allocated resource without having to communicate with the resource manager 210, at least until such time as a relevant aspect of the user account changes, the user is no longer granted access to the resource, or another such aspect changes.

The resource manager 210 (or another such system or service) in this example can also function as a virtual layer of hardware and software components that handles control functions in addition to management actions, as may include provisioning, scaling, replication, etc. The resource manager can utilize dedicated APIs in the interface layer 208, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 208 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 3:
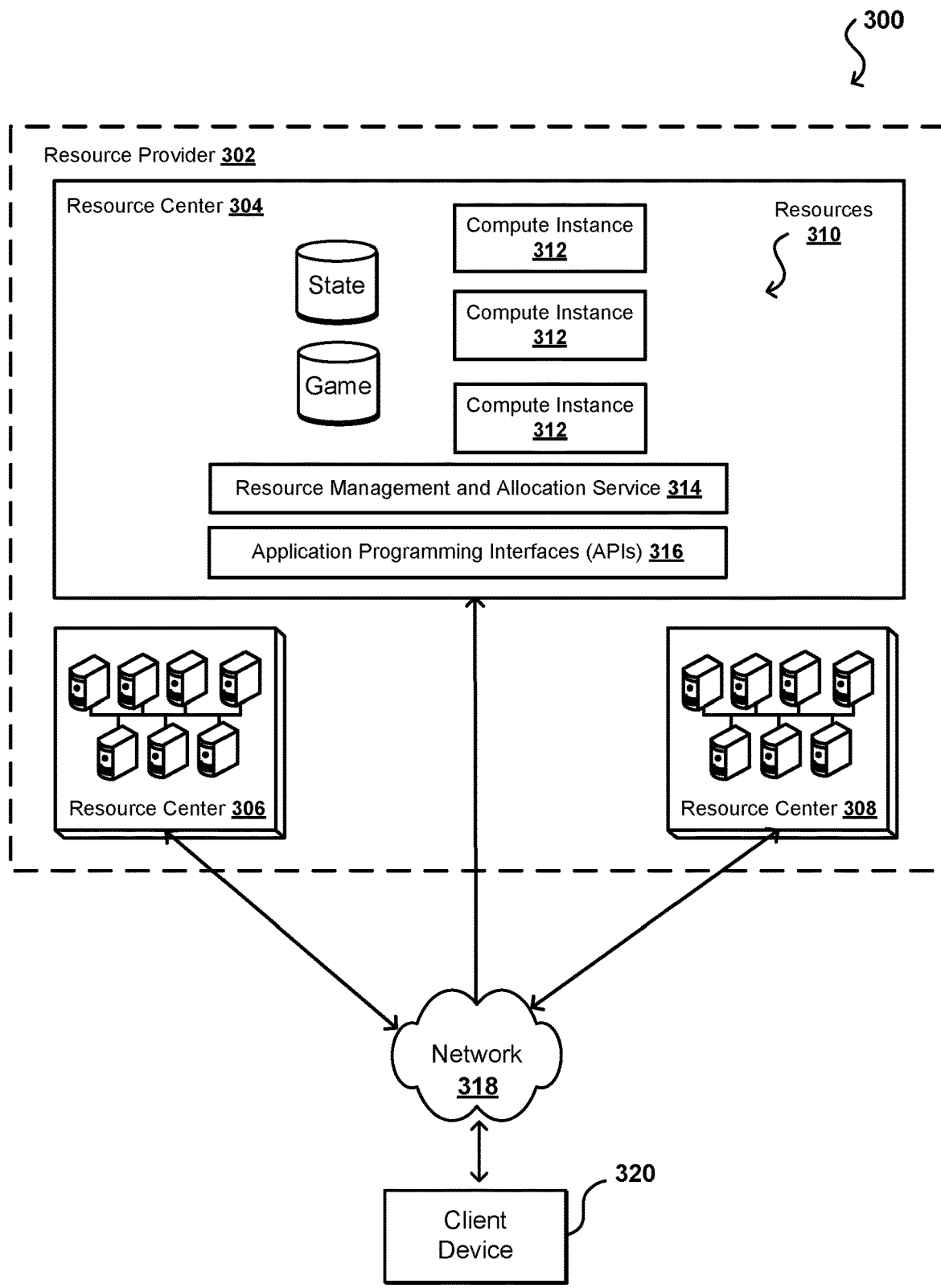
FIG. 3 illustrates another example resource environment in which various embodiments can be implemented.

FIG. 3 illustrates another example resource provider service 300 that can be utilized in accordance with various embodiments. As illustrated, a resource provider environment 302 can include a variety of devices and components (e.g., servers and network infrastructure) for receiving and processing requests from various customers and end users across one or more networks 318. As discussed, access to these resources can be provided as one or more services, such as Web services. In this example, the resource provider environment includes a plurality of resources 310, such as data storage resources and request processing resources, that can be deployed in one or more resource centers 304, 306, 308 that may be in different logical or physical locations, such as in different geographical regions, made accessible over the one or more networks 318. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, gaming host, content delivery network (CDN) point-of-presence (POP), and the like.

In accordance with various embodiments, resource centers of the resource provider 302 may include various computer servers, data storage machines, network devices and other hardware resources necessary to provide the network-accessible services on behalf of the clients of the service provider. For example, as illustrated the resource centers can include physical servers and other devices located in a particular geographical location, which enable the service provider to host game sessions and perform other functions on behalf of various client devices 320. In accordance with an embodiment, a resource center can include media cache servers, gaming servers, data servers, and the like. The view of one of the resource centers 34 is shown in an exploded view to provide further illustration of the types of resources 310 that can be contained in a resource center in accordance with various embodiments. It should be noted that the resources 310 can reside in one resource center or can alternatively be distributed across multiple resource centers.

In accordance with various embodiments, the resource provider 302 offers a resource management and allocation service 314 in addition to many other services discussed herein. In one embodiment, the resource management and allocation service 314 can perform the selection and management of resources used to host sessions for one or more gaming applications associated with a customer of the resource provider. In addition to the computing resources, the hosting of the games may require the allocation of data resources to host game state or game content, among other such options. In accordance with an embodiment, components of the resource provider environment 302 enable a game publisher to provide (e.g. upload) a gaming application to a game content store, where that application can be launched using various compute instances 312 that can each correspond to all, or a subset, of a resource such as a physical server. In accordance with various embodiments, the resource management and allocation service 314 can allocate the compute instances 312 for hosting the various gaming sessions. Information for the sessions can be provided using one or more APIs 316, for example, which can be used to provide the criteria or configuration information to be used for selecting and hosting a game session. In one embodiment, each compute instance is a virtual server resource or virtual node having a specific processing capacity and memory associated therewith, which allows the service provider to meter the usage of the resources for each customer. That is to say that each gaming session can be associated with a customer, and the usage of those resources allocated to the customer can be aggregated for at least cost purposes. In an alternative embodiment, the compute instances can be actual server machines in the resource center 304 maintained by the service provider and leased to its customers as discussed herein.

It should be noted that the locations of the various resources are not limited to any particular resource center, server or physical computing device. It will be evident to one of ordinary skill in the art that various stores, storage containers, servers, compute instances, gaming services, and other resources described herein can be located in any resource center or distributed across multiple resource centers or geographical locations, allowing data or content to be replicated across all or some of the devices therein. For example, one resource center 306 could be in Europe, one resource center 308 could be Asia, and one resource center 310 could be in the United States. In various embodiments, the various storage containers, servers, compute instances, transcoding services and other resources described herein could also reside on a single device.

In accordance with various embodiments, the resource management and allocation service 314 can provide game publishers with an automated game session workflow system that is reliable and scalable. The game publishers may define the session parameters on their own or leverage a set of predefined common device profiles that are provided by the service provider. The service can allow the game publishers to upload game content to the storage instance, define a workflow, host the relevant game session, and deliver the results to the appropriate players or other destinations. In some embodiments, the game session results can be made available or delivered to third parties for distribution, such as through an online video sharing service. Generally, a game publisher (e.g. customer of the resource provider) can register for an account by signing up, for example, with the resource provider to gain access to resource management and allocation service 314. Once an account is created, game content can be placed into a game store on the resource provider. A workflow can be defined using an application programming interface (API) 316 or console, for example, to manage game sessions which will be carried out using one or more of the compute instances 312. In accordance with various embodiments, the resource provider 302 may implement a number of pricing models for using the resources as discussed herein. As one option, the pricing could be based at least in part on the usage of compute instances 312 are utilized by the game publisher, including the type and duration of such utilization. For example, on-demand instances can let customers of the provider pay for compute capacity by the hour or for maximum-duration periods of time, as discussed elsewhere herein. As an alternative option, the game publishers can use reserved compute instances. When using reserved instances, game publishers can make a one-time, up-front payment for each instance they wish to reserve for a long period of time (e.g. 1-3 year term). In return, the customer may be given a discount off the ongoing hourly usage rate for the instances.

As an alternative option, a set of spot instances could be utilized. In accordance with an embodiment, spot instances enable a game publisher to bid on, and purchase, unused capacity of the compute instances of other customers at a market place. In some embodiments, instances sold on the spot market may be reclaimed at any moment (with some notice period) if they are needed for customers that have previously reserved the computing capacity. In some cases, the spot instances may be used for game sessions where the potential for interruption is not extremely important. In other cases, using spot instances may be an effective way to get sessions hosted cheaply if there are a significant number of spot instances available. Taking advantage of low bid opportunities for instances can provide a customer (e.g. a game publisher) with pricing advantages they may not have been offered without building out services on their own.

In accordance with various embodiments, each computing resource instance can be reserved for use by a particular customer or other user for a defined period of time. During the time periods where that customer is not using the resource, at least some excess or otherwise unused resource capacity of that computing resource may be made available to other users on a temporary or non-guaranteed basis, such that the excess resource capacity can be allocated to other users until a time that the capacity is desired for other purposes (e.g., for preferential or reserved use). Such excess capacity may, for example, be made available as part of one or more general excess capacity pools that are available for use by various users, such as via a spot market with dynamically changing pricing to reflect supply and demand. In some cases, one or more programs may be executing on behalf of a user using excess resource capacity at the time that the excess resource capacity is desired for other purposes, and, in some such cases, the use of that excess capacity (e.g., storage for that user in the excess capacity) may be automatically terminated (e.g., deleted) by the computing resource in order to make that excess capacity available for the other purposes. In at least some embodiments, the user requests or operations can be automatically restarted at a future time, such as when a sufficient amount of excess capacity again becomes available for such purposes. Alternatively, other resource capacity may be identified and used in place of the excess resource capacity that is desired for the other purposes, so as to enable the operations relying on the excess resource capacity to continue to be processed or otherwise fulfilled.

Customers can utilize the unused or excess capacity from dedicated, reserved, or other such resource capacity. In accordance with an embodiment, customers can bid to use the excess capacity. For example, a customer can submit a game hosting request for an instance with a bid price and a specification of at least one resource guarantee to be provided for the request, such as a minimum throughput, compute capacity, etc. If a resource becomes available that meets the capacity requirement(s) for the instance request, if the bid exceeds any other requests (or otherwise has preference or priority), and if the bid at least meets a current market price for that capacity, the instance request can be processed using the excess capacity. In various embodiments, the customer with the winning bid will obtain dedicated use of that excess capacity for at least a period of time to process the transcoding operations associated with the instance created per the instance request. After that minimum time, the bid amount can be reexamined and, if the request no longer meets the winning criteria discussed above, or some other such criteria, fulfilling of the instance request for that user on that resource can be terminated (e.g., the instance can be terminated on that resource). Further, if the capacity is excess capacity reserved or dedicated to another user, the customer can be kicked off the resource at any time if the dedicated or reserved customer resumes using that resource.

Figure 4:
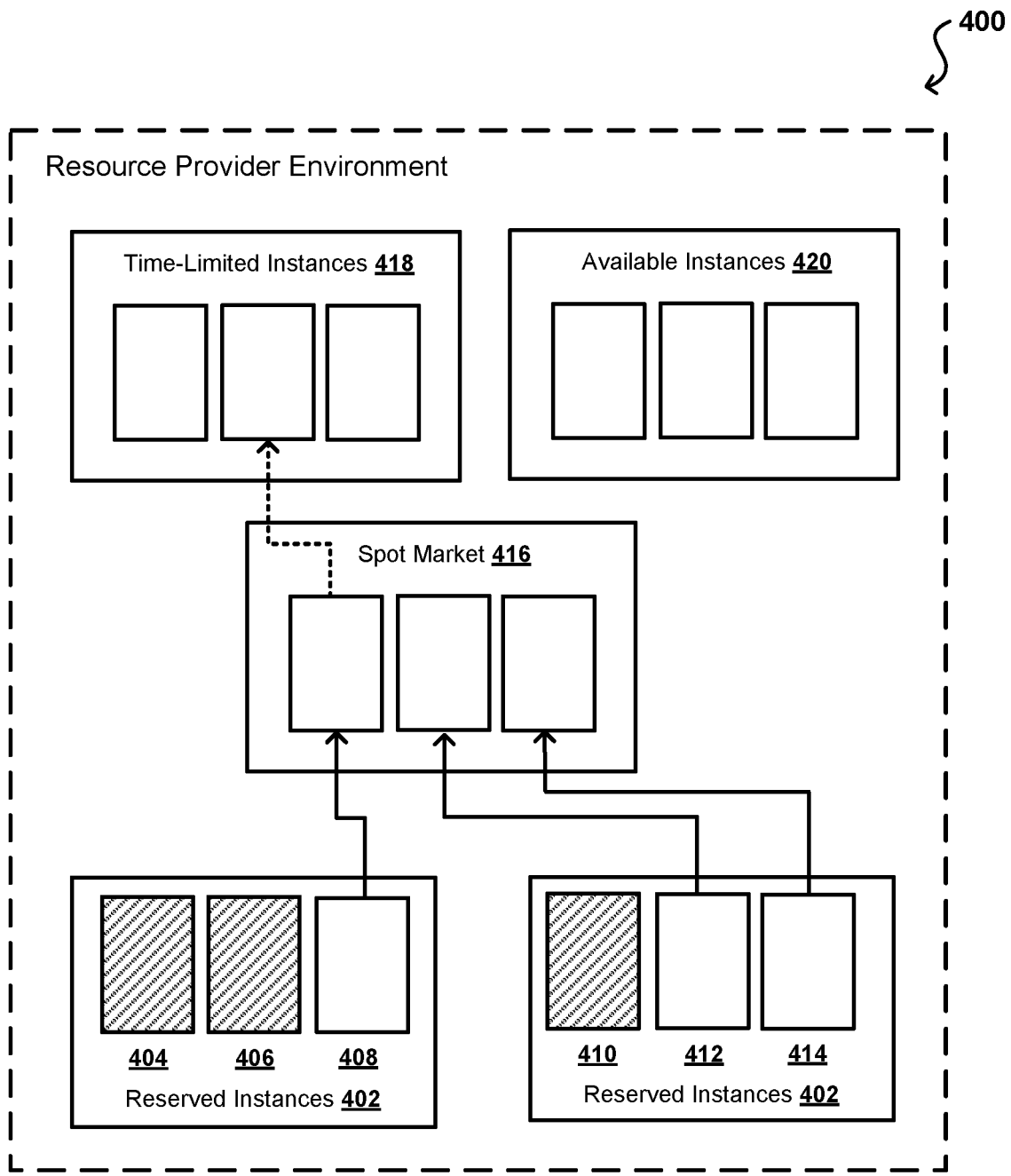
FIG. 4 illustrates an example resource environment including multiple types of instance options that can be utilized in which various embodiments can be implemented.

FIG. 4 illustrates an example resource provider environment that includes various types of capacity that can be allocated for hosting game sessions and other such tasks in accordance with various embodiments. In the illustrated embodiment, the resource provider 400 provides a market whereby a customer can purchase capacity for different types of instances. This can include a spot market 416 that enables various game publishers, or other content publishers or customers, to bid for unused resource capacity of the resource provider 400. The spot market can take the form of a graphical user interface (GUI), console, application programming interface (API), a web application or any other component. In this example, the customer can also purchase time-limited instances 418, which function as guaranteed or reserved instances are only available for up to a maximum length of time. In some embodiments the time-reserved instances can also come from the spot market if the notice period or other criterion for the capacity enables those resources to be provided for the specified period of time without interruption, such as where the notice period is five minutes but the time limited resource is needed for two minutes. The customer can also purchase available instances 420 using a conventional approach, such as to reserve instances for an extended period of time as discussed herein.

In accordance with one embodiment, the resource provider 400 allows customers to reserve resource instances for a specified period of time for a specific price. The resource instance can be any resource that provides some unit of computing capacity, such as a virtual machine, server instance, or the like. For example, as shown in the illustrated embodiment, a first customer has reserved resource instances 404, 406, 408 and a second customer has reserved resource instances 410, 412, 414 for at least a specified time interval. During the time interval that the instances are reserved, the instances can be utilized by the reserving user at any time.

In many instances, however, a reserving user may not always be using all of the resource instances reserved on their behalf. There may often be time periods in the reservation interval, during which some of the reserved instances are remaining idle and not performing any computation. In accordance with an embodiment, the spot market 416 enables the service provider to utilize those idle instances 408, 412, 414 to host gaming sessions or perform various types of jobs for other users, while still guaranteeing that the reserved instances will be ready to immediately begin processing jobs of the reserving user if the need for them should arise. In accordance with an embodiment, the spot market 416 may accept bids for resource capacity from various users, such as one or more game publishers. Once a bid is received, the spot market can evaluate the bid and determine whether it meets or exceeds the current spot market price. In accordance with an embodiment, the current spot market price fluctuates periodically according to supply and demand for resource instances in the spot market. If, at the time of receiving the user's bid, the bid at least meets the current spot market price, the service provider can begin hosting the game session using the spot market instances. The session can continue being executed for as long as the content publisher's bid at least meets the current spot price. In accordance with an embodiment, if the spot market price rises above the bid, the session may be interrupted or suspended. Notice can be given, as with a customer reclaiming the instance, before termination. In accordance with various embodiments, if the reserving users invoke any of the reserved instances that are currently in the spot market 416, those reserved instances may be immediately taken out of the spot market pool and provided to the respective customer that reserved the instance. For example, if a reserving user invokes a resource instance 408, any game session being hosted by that resource instance 408 may be provided with notice before the capacity is reclaimed and allocated to the reserving user. The game session that was previously being hosted by the resource instance 408 may be to another available spot market instance if the bid still at least meets the current spot market price at that time.

Figure 5:
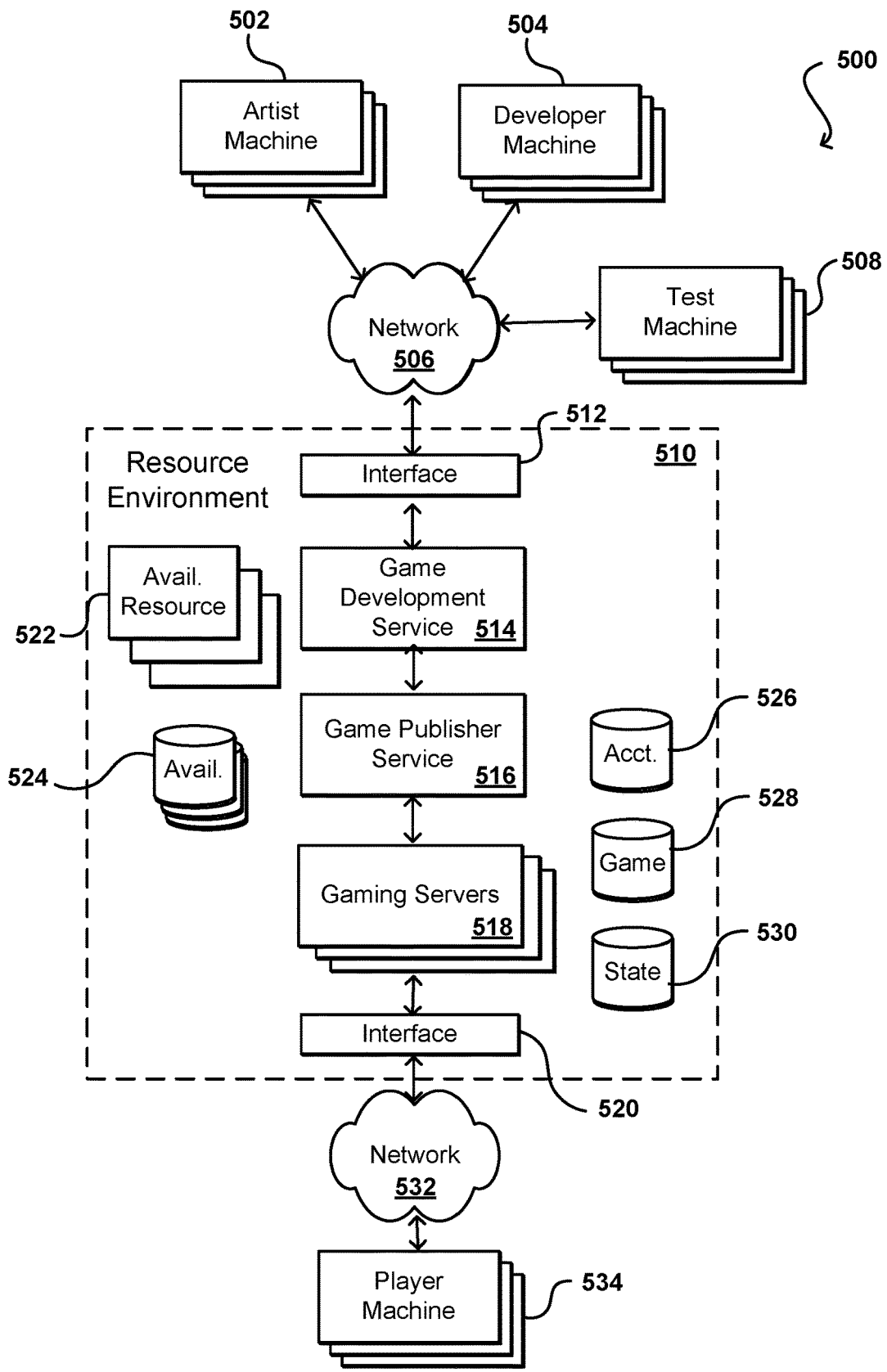
FIG. 5 illustrates an example gaming pipeline that can be used in accordance with various embodiments.

As illustrated in the example system 500 of FIG. 5, at least some of the resources can be used to support platforms and services useful in the development and providing of electronic gaming and three-dimensional graphical content, among other such options. For example, the artist machines 502 and developer machines 504 can collaborate via a game development service 514, which can be provided by a set of resources in the resource environment 510 that are able to scale dynamically as discussed above. It should be understood that artists fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 528, where the repositories can include graphics files, code, audio files, and the like. The game development service 514 can also work with an account manager, or at least maintain information in an account data store 526, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like. The game development service 514 can also be used to specify criteria, such as maximum acceptable latency, that can be used to select resource capacity to host sessions for the gaming application.

Once the game development reaches an appropriate stage in the development cycle or pipeline, as may relate to alpha or beta testing, actual release or updating, etc., the appropriate content can be made accessible to a game publisher service 516. The game publisher service 516 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 504 or otherwise. In some embodiments the game content might be published and made available to one or more test machines 508, which may be associated with the customer, such that the customer can test various builds or versions of the game. In some embodiments feedback provided by the test machines 508 may be provided to the game development service 514, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 518 which can run the game and enable player machines 534 to access the game content over one or more networks 532, which may be different from the network(s) 506 used for game development. This can include, for example, dedicated gaming networks, the Internet, cellular networks, and the like. The player machines 534 can communicate with the appropriate interfaces of an interface layer 520 to obtain the gaming content. In some embodiments the player machines 532 will download the gaming content for execution on the individual machines, and will upload (or otherwise communicate) gaming data, messages, and other information to the gaming servers 518, as well as to other players, social networking sites, or other such recipients. The gaming servers 518 can cause state information for the various instances of the game to be stored to at least one game state repository. This can hold state for the game as a whole or for individual game sessions, among other such options. In some embodiments the game content can be executed by the game servers and streamed in near real time to the player machines 534. In some embodiments there may alternatively be a mix of gaming content executed on the player machines and the gaming servers. Peer to peer connections among the player machines and other communications can be utilized as well in various embodiments.

Such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function, whether specifically related to hosting a game session or otherwise. A resource instance can be allocated to run a function in response to a customer request or event, and once the function has completed that instance can either be made available for processing a different event or destroyed, among other such options. In either case, the customer will not be charged for more processing by the instance than was needed to run the function.

As mentioned, the ability to utilize different types of capacity can come with a significant cost savings in at least some embodiments. For example, excess capacity or spot instances can be obtained at significant cost reduction, such as with discounts between 40% and 80% with respect to an on-demand fleet in some embodiments, depending upon the current bid rate for the capacity, among other such factors. Similarly, discounts can also be obtained for the limited time capacity, but these discounts may be less than for the excess capacity and may be at a fixed rate, such as at a 45% discount. In some embodiments the rate may depend in part upon the length of time for which the resource is requested. The additional resource options provide benefit to the customer in relation to cost and potentially performance and other aspects, while such options can provide the resource provider with flexibility in the types of instances used and the ability to place a hosted game server into a region that may be closer to the player than might otherwise be possible, potentially improving latency and other such characteristics. The flexibility can also help the resource provider to rebalance capacity as appropriate. As mentioned, potential tradeoffs for the customer are the potential for excess capacity instances to be interrupted, or for games to time out if hosted on limited time instances. Further, since excess capacity for a particular type of resource may be insufficient at the time of a request, a customer can specify multiple acceptable instance types with appropriate configurations that can be used to host the game session. A customer might then provide selection criteria or preferences, such as to select the available type with the lowest cost, highest performance, or lowest risk of interruption, among other such options. A customer in some embodiments might also provide priority selections with respect to the geographic locations of the resources. The flexibility of instance type can also reduce the amount of time needed to initiate a game session, particularly where some instance types can be queued up for such hosting when capacity is available. In some embodiments a resource console can be used to manage the various instance options.

In some embodiments, a ranking may not be used to select the appropriate resource capacity. Instead there may be a start point for the search, which may continue until an appropriate type of resource capacity is located. For example, a resource management service or game hosting service might determine the locations of players to a game session, and determine a location for potential resource capacity that is closest to those players or would offer reduced latency or otherwise improved performance. In such an approach, an instance can be selected as soon as one is found that satisfies the various hosting criteria, in order to start the game more quickly. The search can continue and extend to different locations until appropriate capacity is located.

Figure 6:
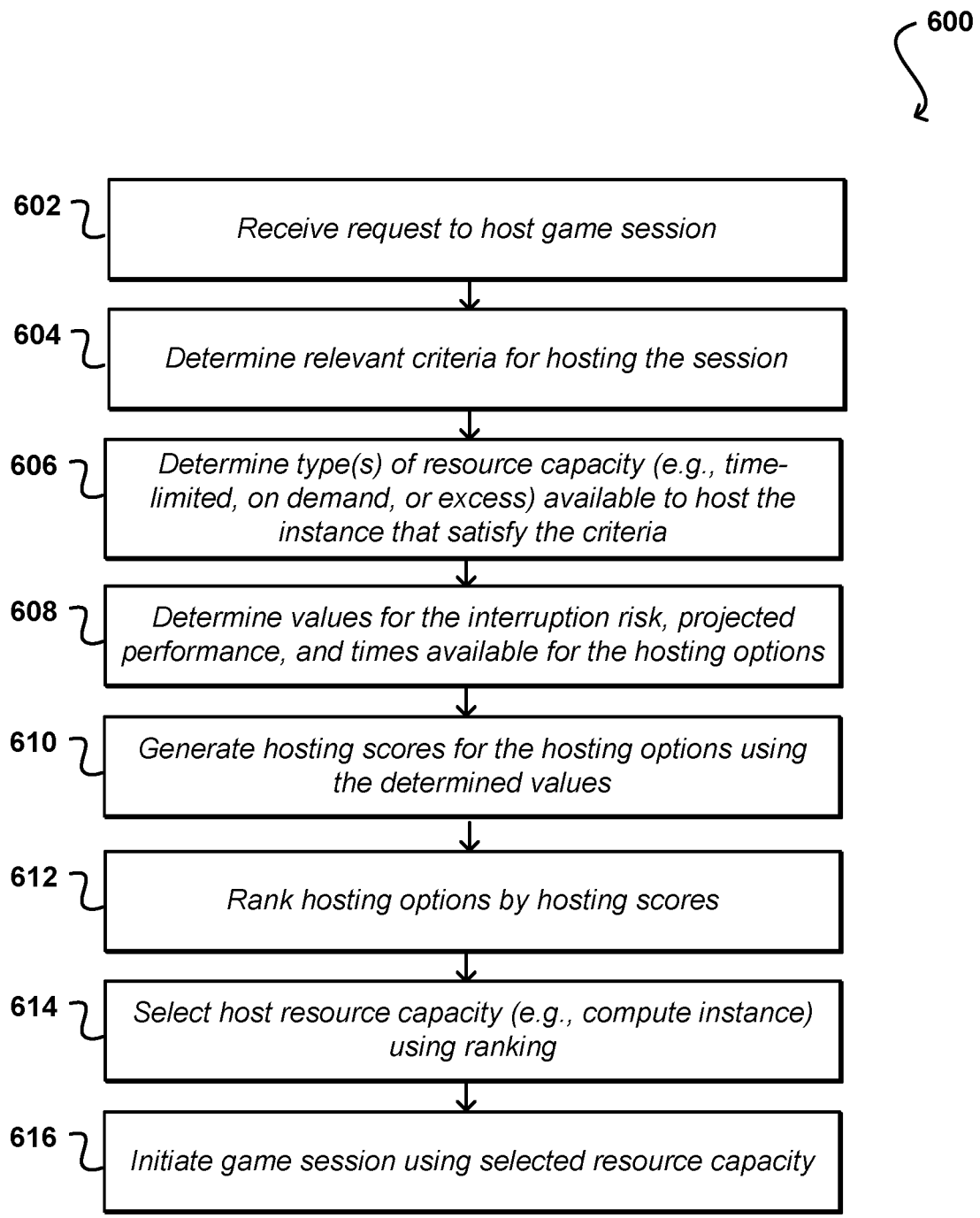
FIG. 6 illustrates an example process for allocating resources for gaming sessions that can be utilized in accordance with various embodiments.

FIG. 6 illustrates an example process 600 for identifying resource capacity to host a game session that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications are a primary example utilized herein, it should be understood that other types of applications or content can benefit from advantages of the various embodiments as well, where the users are selected from a pool of potential users for a specific session or purpose, etc. In this example, a request is received 602 to host a game session using resource capacity from a resource provider environment. The request can be received from a game publisher system or from an individual client device to participate in the game session, among other such options. In at least some embodiments, one or more aspects of the request are verified before processing. These aspects can include, for example, a valid request format, a type of game capable of being hosted by the resources, authorization to host the game, a valid requestor identity or gaming customer identity, and the like.

If the request is a valid and authorized request in this example, the relevant criteria for hosting the game session can be determined 604. As mentioned, this might include a set of types of resources that the customer has approved for hosting sessions, a length of time needed for the game session, as well as various performance or configuration criteria as discussed elsewhere herein, among other such options. A resource management service or other such system can determine 606 the type(s) of resource capacity that are available to host the instance that satisfy the above criteria. These types can include, for example, on-demand capacity purchased for an extended period of time, limited time capacity, or excess but interruptible capacity, among others. The various hosting options can be analyzed to determine 608 respective values relating to, for example, a projected risk of interruption, the projected performance, and the times available for hosting the session for each hosting option. Based at least in part upon these values, as may be processed according to a scoring algorithm or function, a set of hosting scores can be calculated for the various hosting options. The scoring function can be provided by a customer, can use customer-specified weightings, or can use weightings learned over time using machine learning, among other such options. The hosting scores can then be used to rank 612 the various hosting options, such as from a highest to a lowest hosting score. A hosting option, or available host resource capacity, can then be selected 614 using the ranking, such as to select a highest ranked hosting option. As mentioned, the hosting option can relate to a type of compute instance, such as a limited time instance or instance provided using excess capacity as discussed herein. The game content can then be loaded onto the selected host as appropriate and the game session initiated 616 on the selected game server host instance.

An approach such as that described with respect to FIG. 6 enables selection among various types of resources based upon resources that satisfy the various criteria, and that provide cost savings that justify the potential tradeoffs. It might be the case, however, that a type of game does not lend itself to certain types of capacity. For example, a game of indefinite duration may not be successfully hosted on a limited time instance. Further, certain game publishers may not want to have their games potentially interrupted at any time, as that may significantly degrade the user experience for certain types of game. Further still, some providers might not provide excess capacity and limited time resources in some implementations.

Figure 7:
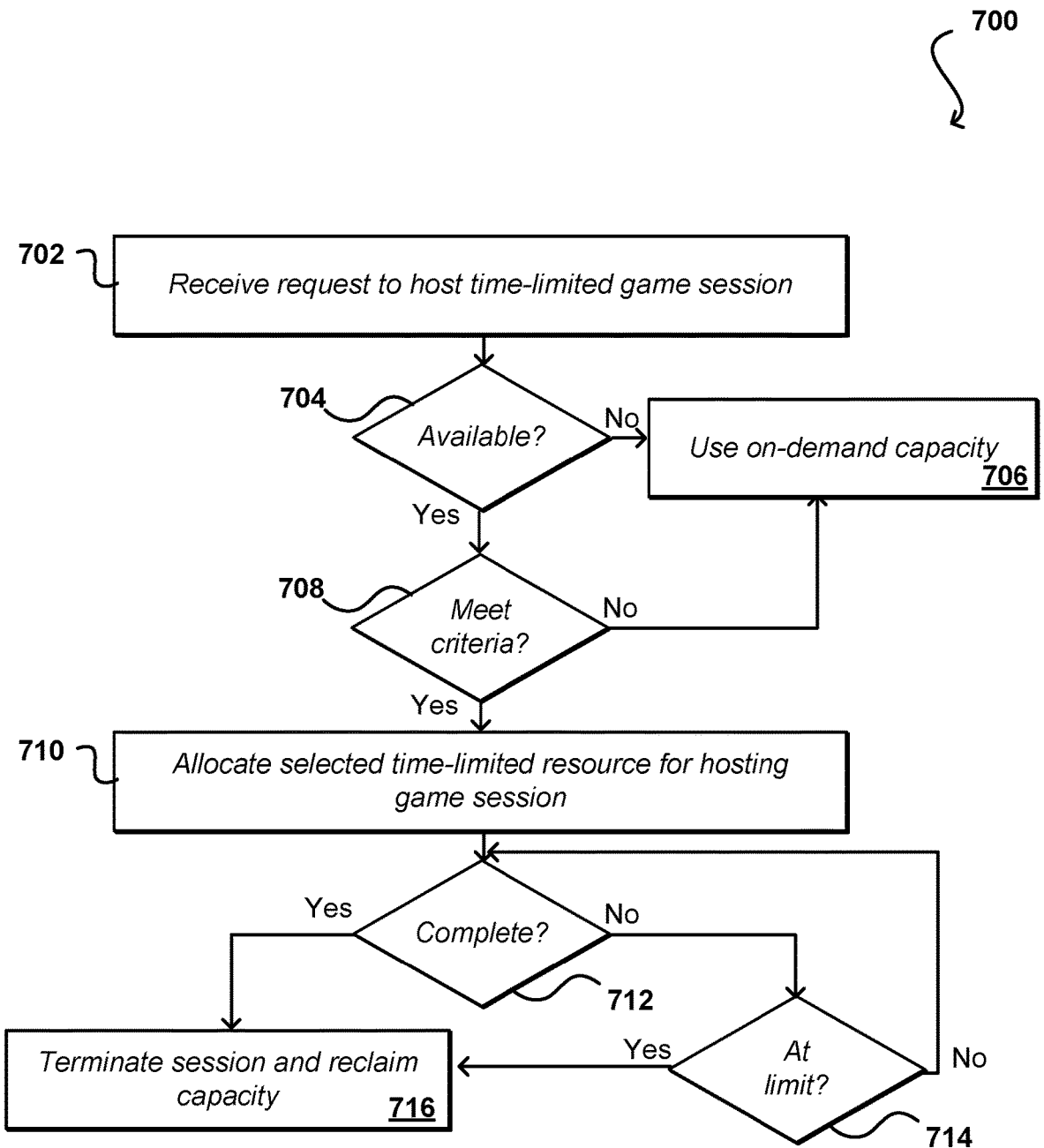
FIG. 7 illustrates an example process for utilizing a time-limited resource to host a gaming session that can be utilized accordance with various embodiments.

FIG. 7 illustrates an example process 700 for utilizing limited time resources for hosting game sessions that can be utilized in accordance with various embodiments. In this example, a request is received 702 to host a game session, where the game session will have a fixed or maximum duration. The time duration can be included in the request or specified for the type of game, among other such options. A determination can be made 704 as to whether any limited time resources are available that can host for at least the requested length of time. If not, conventional on-demand capacity can be utilized 706, where the customer is required to purchase an amount of capacity that will be available for use by, or on behalf of, that customer for an extended period of time, such as a month. If limited time capacity is available, another determination can be made 708 as to whether any of the available capacity meets the criteria for the requested session. As mentioned, this can include criteria such as maximum latency and minimum performance, as well as the relevant configuration and capability for hosting. If not, then on-demand capacity can be used. If such capacity is available, a time-limited resource can be selected and allocated 710 to host the requested game session. The respective players and resources can be notified, or mappings updated to appropriately direct requests and input packets, among other such options. The hosting can continue until it is determined 712 that the session has completed, at which time the session can be terminated 716 and the capacity reclaimed. If the session has not completed but it is determined 714 that the session is at the time limit for the capacity, then the session can be terminated 716 with or without warning, and the capacity reclaimed. As mentioned, in some embodiments the session might be migrated to another resource that is able to host the session, but that resource might come with a higher cost or lower discount, or may not provide the same performance, etc. In some embodiments, a game going beyond its maximum indicated duration can remain on that instance as long as the instance is not already allocated for another task. It is possible, however, that the cost and/or rate for that resource will be increased for the additional time.

Figure 8:
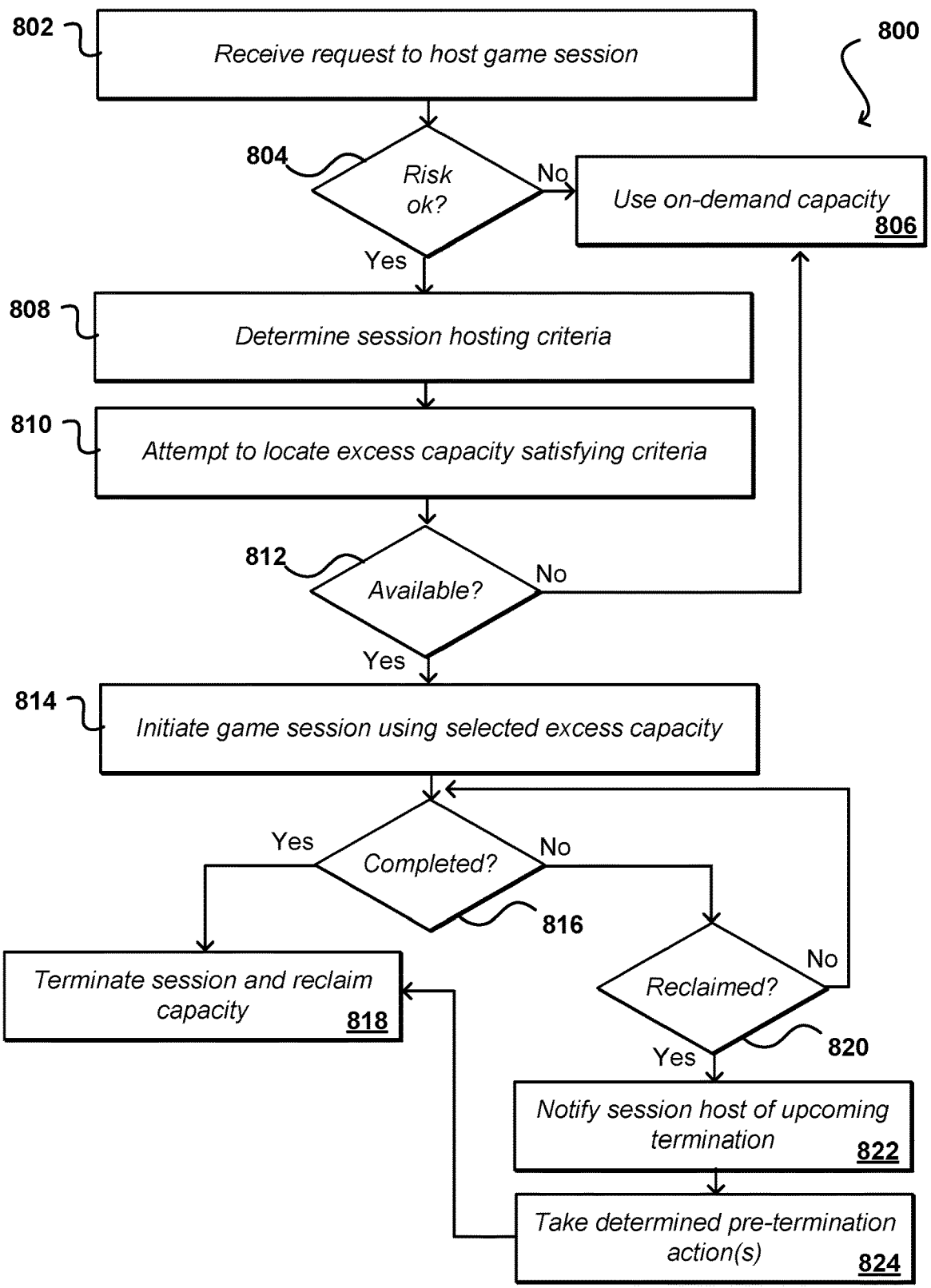
FIG. 8 illustrates an example process for utilizing an interruptible or excess capacity resource to host a gaming session that can be utilized accordance with various embodiments.

FIG. 8 illustrates an example process 800 for utilizing excess resource capacity to host game sessions that can be utilized in accordance with various embodiments. In this example, a request is received 802 to host a game session. The request can come from a number of different sources and have different validations performed as discussed herein. For a valid request, a determination can be made 804 as to whether it is acceptable to have some risk of interruption of the game session in exchange for flexibility in placement. If the customer or request indicates that such risk is not acceptable, then on-demand capacity can be utilized 806 wherein capacity purchased by that customer for long-term use, or other such allocated capacity, can be used to host the session. If at least some amount of risk is determined to be acceptable, the criteria for hosting the game session can be determined 808. As mentioned, the criteria can include maximum interruption risk, maximum latency, minimum performance, and the like. Once obtained, an attempt can be made 810 to locate excess capacity that satisfies the various criteria. As mentioned, excess capacity varies and at any given time there may not be sufficient excess capacity to host a given session, as the capacity of that type might be utilized by the respective customers that have otherwise reserved that capacity. If such capacity is not available, on-demand capacity can be used 806 as discussed previously.

If, however, such excess capacity is available, then a game session can be initiated 814 using the excess capacity. In some embodiments the process of locating capacity will stop once sufficient capacity is found. In other embodiments, an attempt will be made to locate multiple possibilities and then select the optimal option from amongst those possibilities. Once initiated and hosted by an excess capacity resource, such as an excess capacity compute instance, a determination can be made 816 as to whether the session has completed, and if so the session can be terminated 818 and the capacity reclaimed. If the game session has not completed, a determination can be made 820 as to whether the reserved customer has requested to reclaim that capacity for another purpose. If not, the session can continue. If the capacity has been reclaimed, then the hosting instance can be notified 822 of the upcoming termination, such as at two minutes or another determined period before the scheduled termination. The host can then take 824 one or more determined actions, such as to modify the gameplay session or provide notice to the players, among other such options. The session can then be terminated 818 at the scheduled time and the capacity returned for use by the reserved customer. The actions taken upon notification can vary, but can include options such as to increase game difficulty, start a sudden death mode, start a game end countdown, or potentially offer some type of compensation to the players for the fact that the game session will be terminated. Various other options can be utilized as well within the scope of the various embodiments.

In some embodiments the customer may have specified a maximum interruption risk. Various metrics can be tracked on historical resource performance to attempt to predict the risks of interruption based on various criteria, as may relate to the type or location of the instance, the customer having reserved the instance, the current workload, etc. In some embodiments an API can be exposed that can be called to obtain information regarding the probability of a particular instance being interrupted. In some embodiments the option will be selected that has the lowest probability of interruption but still satisfies the various session criteria.

In some embodiments the resource capacity can also potentially be offered by multiple parties or providers. For a capacity market, instead of just accepting bids from customers for capacity, the market could also accept bids from providers for providing capacity. The system can then further place sessions on resources based upon cost, where the cost may be the lowest cost among providers offering that type of resource capacity. Providers can also choose to submit bids only for certain types of capacity, such as for only excess capacity or only for limited time instances up to an hour in duration, etc.

Figure 9:
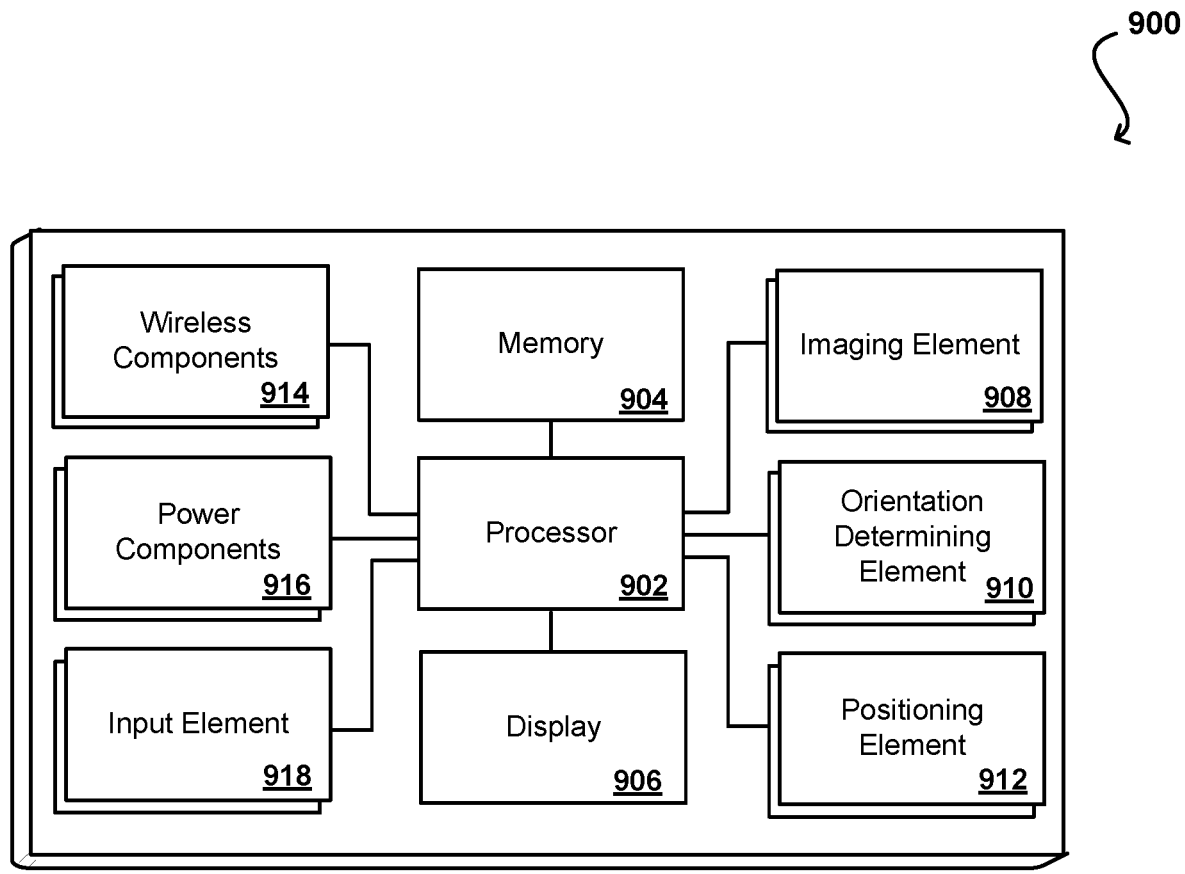
FIG. 9 illustrates example components of a computing device that can be used to implement aspects of the various embodiments.

FIG. 9 illustrates a set of basic components of an electronic computing device 900 that can be utilized to implement aspects of the various embodiments. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices. The device typically will include some type of display screen 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    determining a session to be hosted using a set of resources;
    determining, for the set of resources, a probability of the session being interrupted before the session is completed;
    selecting a session host from the set of resources based at least in part upon the probability of the session being interrupted on that session host being at most a maximum value related to a predicted risk of interruption specified for the session; and
    causing the session to be initiated using the selected session host.

2. The computer-implemented method of claim 1, further comprising:
    determining a subset of reserved resource capacity that is currently unutilized by a respective reserved customer, the subset of reserved resource capacity capable of being reclaimed by the respective reserved customer; and
    determining the probability for the set of the resources being interrupted based at least in part upon historical data for the subset of reserved resource capacity being reclaimed by the respective reserved customer.

3. The computer-implemented method of claim 1, further comprising:
    selecting the session host based further upon an anticipated latency for the host.

4. The computer-implemented method of claim 1, further comprising:
    selecting the session host based further upon an available amount of time of the host.

5. The computer-implemented method of claim 1, further comprising:
    selecting the session host having the lowest probability of interruption.

6. The computer-implemented method of claim 1, further comprising:
    receiving a notification that the session host is being reclaimed for another reserved purpose; and
    terminating the session at a determined time after the notification.

7. The computer-implemented method of claim 6, further comprising:
    modifying one or more aspects of the session in response to the notification, the one or more aspects relating to a time remaining in the session or compensation provided to participants of the session.

8. The computer-implemented method of claim 1, further comprising:
    determining geographic areas for player devices associated with the session; and
    selecting the session host further based on proximity to the geographic areas.

9. The computer-implemented method of claim 1, further comprising:
    receiving an indication of types of resources and resource configurations permissible to host the session; and
    selecting the session host further based upon the indication.

10. The computer-implemented method of claim 1, wherein the session host is a virtual resource instance among a plurality of virtual resource instances operating on a physical computing device.

11. A system, comprising:
    at least one processor; and
    memory including instructions that, when executed by the at least one processor, cause the system to:
        receive a request to initiate a session;
        select a session host, from a set of resources, for hosting the session based at least in part upon a value related to a predicted risk of interruption for the set of resources due to the resource hosting a separate operation; and initiate the session using the selected session host.

12. The system of claim 11, wherein the instructions when executed further cause the system to:

determine a subset of reserved resource capacity that is currently unutilized by a respective reserved customer, the subset of reserved resource capacity capable of being reclaimed by the respective reserved customer; and determine the risk of interruption for the set of resources based at least in part upon historical data for the subset of reserved resource capacity being reclaimed by the respective reserved customer.

13. The system of claim 11, wherein the instructions when executed further cause the system to:

select the session host based further upon an anticipated latency for the host.

14. The system of claim 11, wherein the instructions when executed further cause the system to:

select the session host based further upon an available amount of time of the host.

15. The system of claim 11, wherein the instructions when executed further cause the system to:

select the session host having the lowest risk of interruption.

16. The system of claim 11, wherein the instructions when executed further cause the system to:

receive a notification that the session host is being reclaimed for another reserved purpose; and terminate the session at a determined time after the notification.

17. The system of claim 16, wherein the instructions when executed further cause the system to:

modify one or more aspects of the session in response to the notification, the one or more aspects relating to a time remaining in the session or compensation provided to participants of the session.

18. The system of claim 11, wherein the instructions when executed further cause the system to:

determine geographic areas for player devices associated with the session; and select the session host further based on proximity to the geographic areas.

19. The system of claim 11, wherein the instructions when executed further cause the system to:

receive an indication of types of resources and resource configurations permissible to host the session; and select the session host further based upon the indication.

20. The system of claim 11, wherein the session host is a virtual resource instance among a plurality of virtual resource instances operating on a physical computing device.

* * * * *